(12) United States Patent
Nakajima et al.

(10) Patent No.: US 7,988,223 B2
(45) Date of Patent: Aug. 2, 2011

(54) VEHICLE COWL STRUCTURE

(75) Inventors: Yasuo Nakajima, Milton Keynes (GB); Hideaki Ono, Sagamihara (JP); Toshiyuki Terada, Chofu (JP)

(73) Assignee: Nissan Motor Co., Ltd., Kanagawa (JP)

( * ) Notice: Subject to any disclaimer, the term of this patent is extended or adjusted under 35 U.S.C. 154(b) by 825 days.

(21) Appl. No.: 11/052,795

(22) Filed: Feb. 9, 2005

(65) Prior Publication Data
US 2005/0179285 A1 Aug. 18, 2005

(30) Foreign Application Priority Data
Feb. 13, 2004 (JP) ................................ P2004-036795

(51) Int. Cl.
 *B60S 1/04* (2006.01)
(52) U.S. Cl. ........................................................ 296/192
(58) Field of Classification Search .................. 296/192, 296/187.04, 193.11
See application file for complete search history.

(56) References Cited

U.S. PATENT DOCUMENTS

| | | | | |
|---|---|---|---|---|
| 4,771,679 A * | 9/1988 | Tsuru | ............................ | 454/146 |
| 6,193,304 B1 * | 2/2001 | Takahashi et al. | ............. | 296/192 |
| 6,193,305 B1 * | 2/2001 | Takahashi | ..................... | 296/192 |
| 6,565,148 B1 | 5/2003 | Teramoto et al. | | |
| 6,633,089 B2 * | 10/2003 | Kimura | ......................... | 296/192 |
| 6,722,731 B2 * | 4/2004 | Cornils et al. | ................ | 296/201 |
| 6,923,286 B2 * | 8/2005 | Sato et al. | ..................... | 180/274 |
| 7,004,534 B2 * | 2/2006 | Yoshii et al. | .................. | 296/192 |
| 2005/0205333 A1 * | 9/2005 | Mori et al. | ..................... | 180/274 |
| 2005/0206139 A1 * | 9/2005 | Mori et al. | ..................... | 280/730.1 |
| 2005/0257979 A1 * | 11/2005 | Hamada et al. | ............... | 180/274 |

FOREIGN PATENT DOCUMENTS

| | | |
|---|---|---|
| EP | 1155931 A2 | 11/2001 |
| EP | 1346903 A2 | 9/2003 |
| JP | 01-161989 | 11/1989 |
| JP | 05-008763 | 1/1993 |
| JP | 08310447 A * | 11/1996 |
| JP | 09-132089 | 5/1997 |
| JP | 10-045035 | 2/1998 |
| JP | 10044884 A * | 2/1998 |
| JP | 11165654 A * | 6/1999 |
| JP | 2000-001177 | 1/2000 |
| JP | 2001-030955 | 2/2001 |
| JP | 2001-322562 | 11/2001 |
| JP | 2001322562 A * | 11/2001 |

(Continued)

OTHER PUBLICATIONS

Japanese Notification of Reasons for Refusal, w/ English translation thereof, Issued in Japanese Patent Application No. JP 2004-036795 dated May 19, 2009.

*Primary Examiner* — Kiran B. Patel
(74) *Attorney, Agent, or Firm* — McDermott Will & Emery LLP

(57) ABSTRACT

A vehicle cowl structure is provided with a cowl box disposed so as to be positioned between a rear end portion of a hood and a front end portion of a front glass, a cowl cover covering an upper portion of the cowl box; and a vertical wall provided at a position under the rear end portion of the hood in the cowl cover. The vertical wall is slantingly disposed rearward and obliquely upward in the cowl cover.

9 Claims, 6 Drawing Sheets

FOREIGN PATENT DOCUMENTS

| JP | 2002-046649 | | | 2/2002 |
| JP | 2002-211439 | | | 7/2002 |
| JP | 2003112659 | A | * | 4/2003 |
| JP | 2003182637 | A | * | 7/2003 |
| JP | 2003252145 | A | * | 9/2003 |
| JP | 2005014677 | A | * | 1/2005 |
| JP | 2005053287 | A | * | 3/2005 |

* cited by examiner

VEHICLE COWL STRUCTURE

BACKGROUND OF THE INVENTION

The present invention relates to a vehicle cowl structure, and particularly to a cowl cover structure covering an upper opening of a cowl box disposed in a front end portion of a front glass of an automobile.

An engine room of the automobile is covered with a hood, and the cowl box is disposed between a rear end portion of the hood and the front end portion of the front glass. An upper part of the cowl box is opened, and the opening portion is covered with the cowl cover.

Japanese Patent Application Laid-Open Publications 2001-322562 and 2002-211439 disclose a construction admitting the outside air into the inside, while preventing the infiltration of rain water, snow, or the like into the inside of the cowl box, and separating the rain water or the like in the cowl box.

SUMMARY OF THE INVENTION

However, upon the study of the present inventors of the present invention, in such a construction, a vertical wall of a cowl cover is extended approximately vertically or formed in an approximately trapezoidal shape, thereby increasing rigidity. Therefore, when an impact load is inputted in a hood when a vehicle collides, the hood is impeded from deforming downward. Accordingly, it is considered that sufficient absorption of impact energy is possibly influenced.

Also, in order to improve the absorption of the impact energy, if the whole body of the cowl cover is thinned, lowering of rigidity of the cowl cover is thereby caused. Therefore, such a situation as the cowl cover being deformed can be considered even when a relatively small load is inputted.

In view of the above-described studies conducted by the present inventors, the present invention is completed, and the object of the present invention is to provide a cowl structure of a vehicle capable of efficiently absorbing impact energy when the vehicle collides, while having sufficient support rigidity at normal time.

In order to achieve the aforementioned object, in one aspect of the present invention, the cowl structure of comprises: a cowl box disposed so as to be positioned between a rear end portion of a hood and a front end portion of a front glass; a cowl cover covering an upper portion of the cowl box; and a vertical wall provided at a position under the rear end portion of the hood in the cowl cover, the vertical wall being slantingly disposed rearward and obliquely upward in the cowl cover.

Other and further features, advantages, and benefits of the present invention will become more apparent from the following description taken in conjunction with the following drawings.

DETAILED DESCRIPTION OF THE PREFERRED EMBODIMENTS

A vehicle cowl structure of each embodiment according to the present invention will be explained in detail with reference to FIGS. 1 to 6 hereafter. Incidentally, note that the arrow L indicates the left direction of a vehicle, the arrow PR indicates the rearward direction of the vehicle, and the arrow UPR indicates the upward direction of the vehicle, respectively.

First Embodiment

First, the vehicle cowl structure of a first embodiment according to the present invention will be explained in detail with reference to FIGS. 1 to 4.

Figure 1:
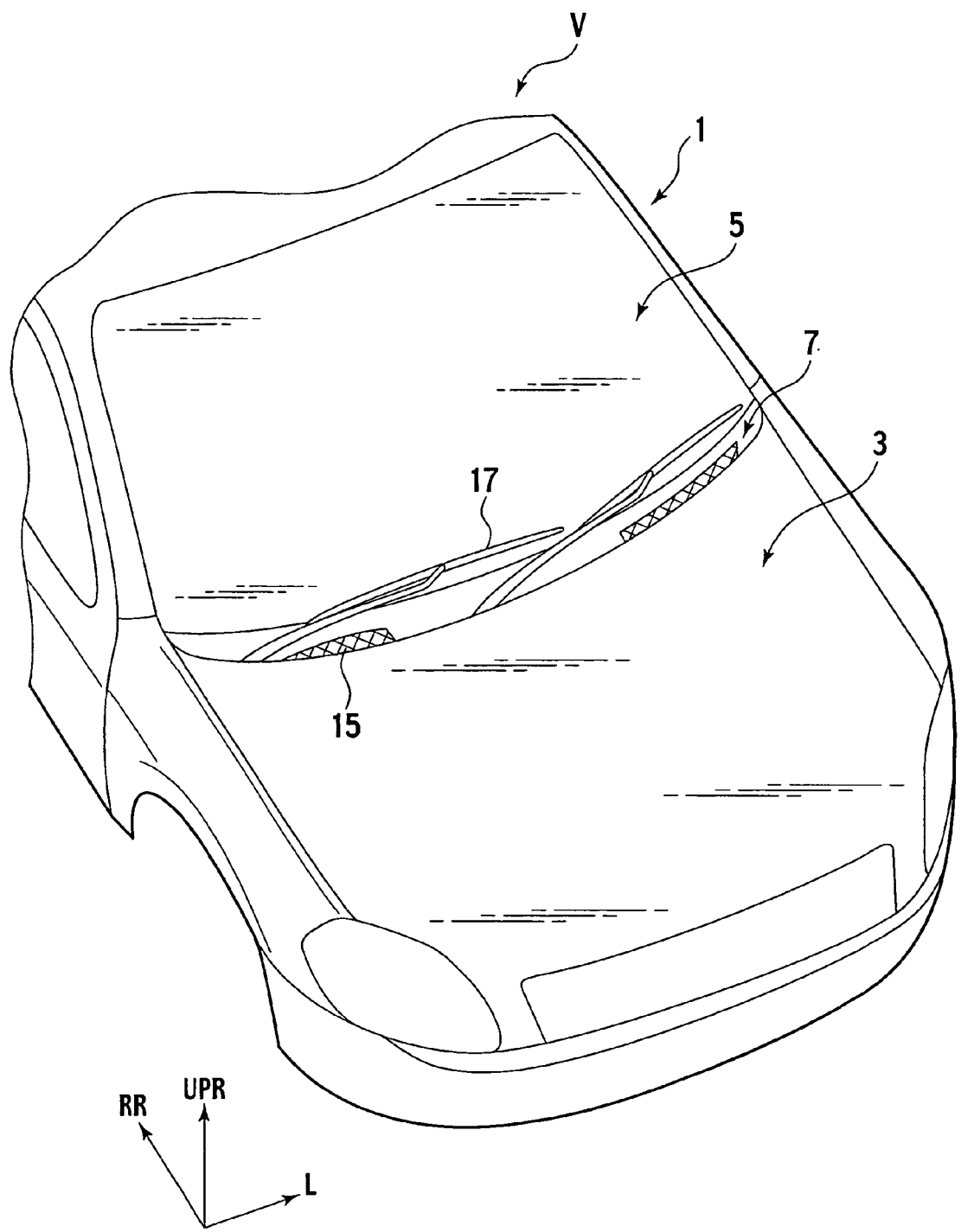
FIG. 1 is a perspective view illustrating a front portion of a vehicle in which a cowl cover of a first embodiment according to the present invention is arranged.
Figure 2:
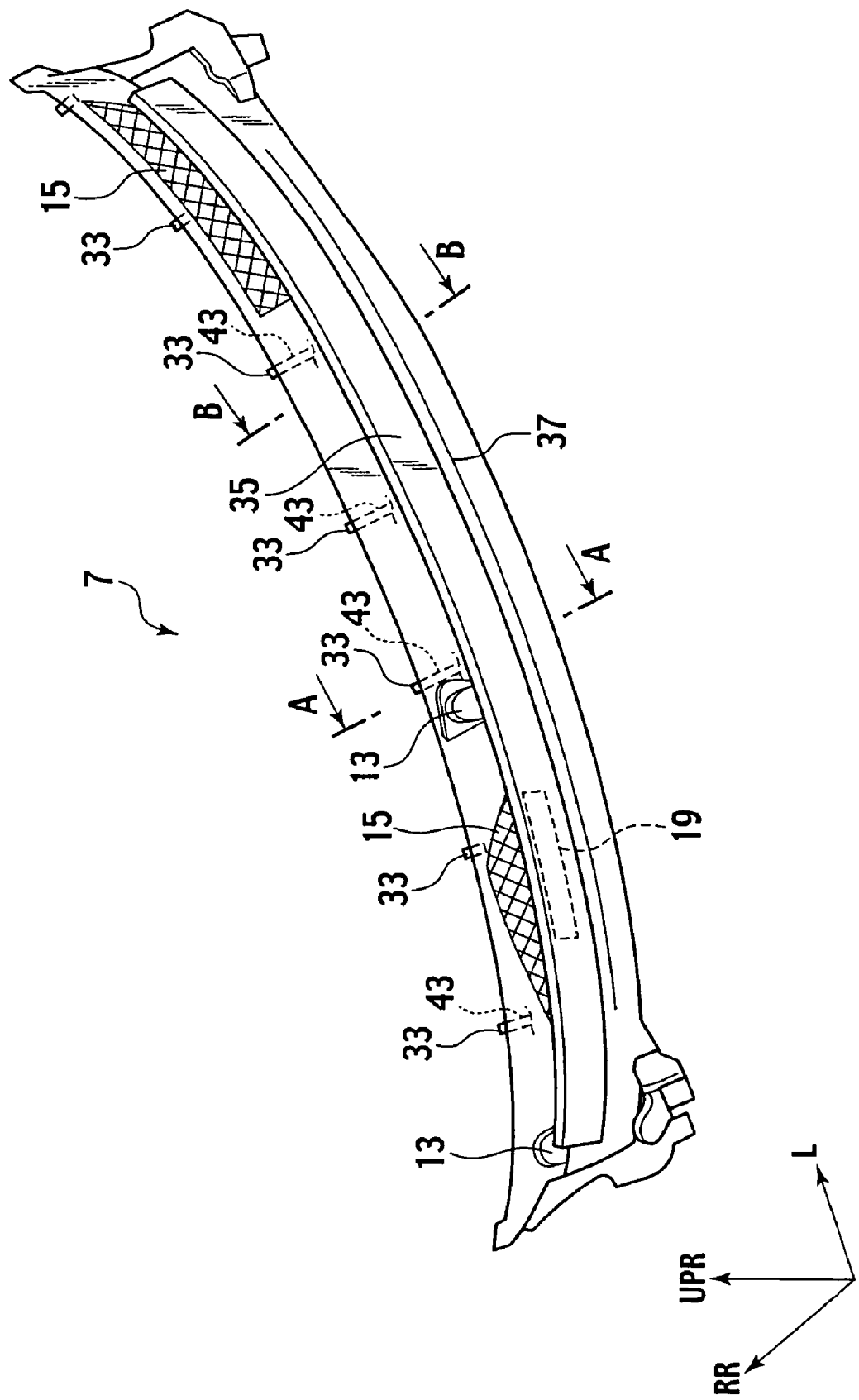
FIG. 2 is a perspective view of the cowl cover of the presently filed embodiment.
Figure 3:
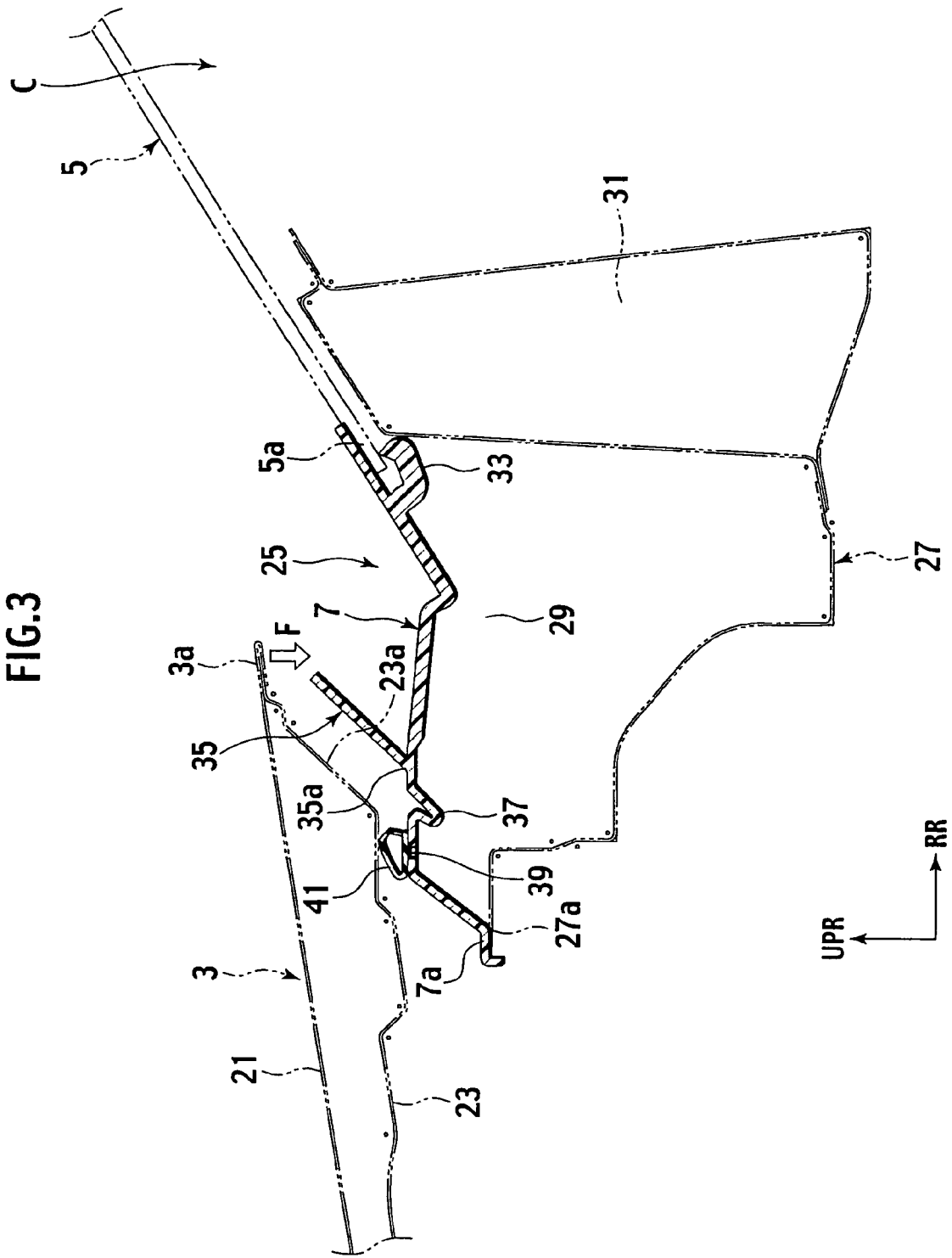
FIG. 3 is a cross sectional view of a vehicle front portion in which a cowl cover of the presently filed embodiment is arranged, corresponding to an enlarged cross sectional view of FIG. 2 taken along the line A-A.
Figure 4:
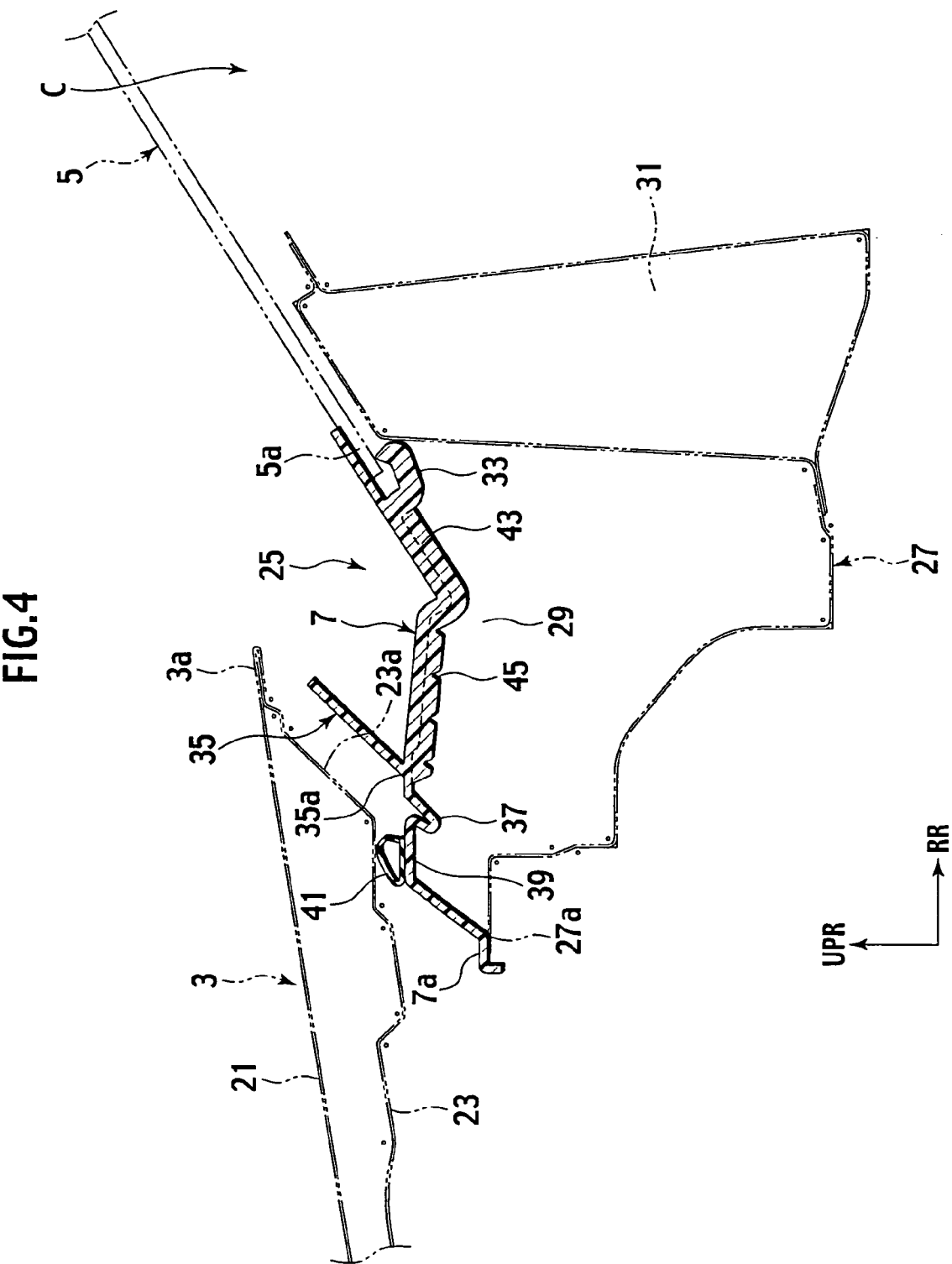
FIG. 4 is a cross sectional view of the vehicle front portion in which the cowl cover of the presently filed embodiment is arranged, corresponding to the enlarged cross sectional view of FIG. 2 taken along the line B-B.

FIG. 1 is a perspective view illustrating a front portion of a vehicle V in which a cowl cover of the presently filed embodiment is arranged; FIG. 2 is a perspective view of the cowl cover of the presently filed embodiment; FIG. 3 is a cross sectional view of a vehicle front portion in which the cowl cover of the presently filed embodiment is arranged, corresponding to an enlarged cross sectional view of FIG. 2 taken along the line A-A; and FIG. 4 is a cross sectional view of the vehicle front portion in which the cowl cover of the presently filed embodiment is arranged, corresponding to an enlarged cross sectional view of FIG. 2 taken along the line B-B.

As shown in FIG. 1, in a vehicle front portion 1, a hood 3 covering an engine room is arranged. A cowl cover 7 is arranged between a rear end portion of the hood 3 and a front end portion of a front glass 5, while extending in a direction of vehicle width.

As shown in FIG. 2, the cowl cover 7 has almost the same width as that of the hood 3 in the direction of vehicle width, and serves as a thin plate-like outer ornamental member formed into an arch shape in a plan view. The cowl cover is made of polypropylene resin or the like colored in black, etc, and formed by injection molding of the polypropylene resin or the like.

The cowl cover 7 has wiper insertion holes 13, slits 15, and a vehicle number confirmation window 19. A wiper pivot for supporting a wiper arm 17 is inserted into the wiper insertion hole 13, and the outside air is admitted from the slit 15. Also, the vehicle number confirmation window 19 is formed in a long rectangular shape in a direction of vehicle width to make the vehicle number visible, which is stamped in the vehicle.

More specifically, as shown in FIGS. 3 and 4, the front end portion of the cowl cover 7 is formed so as to correspond to the shape of a cowl box 27. The hood 3 is constituted of an outer panel 21 disposed in an upper side, and an inner panel 23 disposed in a lower side, while hemming an outer peripheral edge of the inner panel 23 with the outer panel 21. Meanwhile, on the side of a cabin C, the front glass 5 is extended rearward and obliquely upward.

A cowl portion 25 is disposed between the front end portion of the front glass 5 and the rear end portion of the hood 3. The cowl portion 25 is constituted of a lower side cowl box 27 and the cowl cover 7 made of resin covering an upper opening of the cowl box 27.

In the cowl box 27, an opening part 29 is formed at the upper part, and a closed cross sectional portion 31 is formed in the rear part. The closed cross sectional portion 31 is arranged in the lower part of a front end edge 5a of the front glass 5.

A front edge 7a of the cowl cover 7 is secured to the front end edge 27a of the cowl box 27 through a clip not shown, and the rear end of the cowl cover 7 is supported by grasping the front end edge 5a of the front glass 5 with a plurality of hooks 33 formed into an approximately L-shape. Thus, the opening part 29 of the cowl box 27 is covered with the cowl cover 7. Incidentally, note that the hooks 33 may be replaced with fixing clips which are separate bodies from the cowl cover 7, if space is not formed between the front glass 5 and the cowl cover 7.

In the cowl cover 7 of the part that comes under the hood 3, a vertical wall 35 extending rearward and obliquely upward is integrally formed. The vertical wall 35 is a plate-like member extended from the upper surface of the cowl cover 7, and is extended approximately parallel to a rear end face 23a of the inner panel 23 of the hood 3. In addition, a recessed portion 37, which serves as a fragile portion, is formed in the front portion of a base portion 35a of the vertical wall 35 in such a way that the face of the cowl cover 7 is recessed downward to make it protrude downward near the base portion 35a. The flexural deformation of the cowl cover 7 is started from the recessed portion 37 when the load exceeding a predetermined level that acts downward, or typically an impact load F due to vehicle collision is inputted. Incidentally, note that both of the vertical wall 35 and the recessed portion 37 are formed over the whole width of the cowl cover 7 in the direction of vehicle width. Further, in the cowl cover 7, the plate thickness formed over a part from the plurality of hooks 33 to the vertical wall 35 is larger than the plate thickness formed over the part from the vertical wall 35 to the front side portion.

Further, a mounting hole 39 is formed on the front side of the recessed portion 37, and an elastic seal body 41 is fitted into the mounting hole 39. The elastic seal body 41 is made of synthetic rubber, and abuts against the inner panel 23 when the hood 3 is closed, and elastically deformed by being pressed by the inner panel 23, to thereby prevent the cowl cover 7, which is made of rigid material, from directly striking against the hood 3, influencing the hood 3, and also prevent infiltration of water drops and dusts into the inner part of the engine room. Incidentally, note that the elastic seal material 41 may also be formed of urethane sponge.

Particularly, as shown in FIGS. 2 and 4, a plurality of reinforcing ribs 43 are arranged in the direction of vehicle width at predetermined intervals. Such ribs 43 are extended along the vehicle longitudinal direction over the part from each hook 33 for grasping the front glass 5 to the vertical wall 35, and formed in a plate-like shape protruding downward from the lower surface of the cowl cover 7. Of course, such ribs may be displaced from the hook 33 in the direction of vehicle width.

In the lower portion of each rib 43, four notches 45 are formed at predetermined intervals in the vehicle longitudinal direction. Each notch 45 is a fragile portion formed in an approximately triangle on the side view, and functions to bend and deform the cowl cover 7 downward, when the impact load exceeding a predetermined level that acts downward, for example, the impact load when the vehicle collides, is inputted. Of course, the number of the notches 45 is exemplary.

Next, the operation in the above-described vehicle cowl structure will be explained.

If the impact load is inputted in the rear end portion of the hood 3 from above, since the vertical wall 35 is formed of plate-like member that extends rearward and obliquely upward from the upper surface of the cowl cover 7, the vertical wall 35 is also deformed downward together with the hood 3. Then, by the deformation of the vertical wall 35, the impact energy is effectively absorbed. Incidentally, on the contrary, if the vertical wall 35 is placed approximately upright in the vertical direction, or formed in an approximately trapezoidal shape, the rigidity of the vertical wall 35 is significantly increased. Therefore, the deformation of the hood 3 is inhibited, and the effective absorption of the impact energy is deteriorated.

In addition, the thickness formed over the part from the vertical wall 35 to the hooks 33 is larger than the thickness formed over the part from the vertical wall 35 to the vehicle front side. Therefore, when the impact load is inputted in the vertical wall 35, the front portions of the vertical wall 35 and the cowl cover 7 are efficiently deformed, whereas, at normal time, sufficient rigidity is exhibited against the load applied by putting the hands thereon by an occupant.

In addition, in the vicinity of the base part of the vertical wall 35, a fragile portion to bend and deform the cowl cover 7, that is, the recessed portion 37, by which the face of the cowl cover 7 is recessed downward, is formed.

Therefore, even when such an impact load is inputted and it is impossible to sufficiently absorb the impact energy only by the deformation of the vertical wall 35, the impact energy is absorbed by deforming the cowl cover 7. Namely, although the cowl cover 7 fails in sufficient deformation if having large rigidity, the cowl cover 7 is smoothly deformed by providing the recessed portion 37, which is a fragile portion serving as a point from which the deformation of the cowl cover 7 is started.

Further, reinforcing ribs 43 are placed upright on the lower surface of the cowl cover 7 along the vehicle longitudinal direction from the vertical wall 35 to the front end portion of the front glass 5, with the plate thickness formed larger than that of the front portion of the vertical wall 35, having notches 45 formed on the lower portions of the reinforcing ribs 43. Therefore, the deformation of the cowl cover 7 is accelerated when the impact load is inputted, while enhancing the rigidity of the cowl cover 7 at normal time. That is, the notches 45 serve as points from which the flexural deformation of the cowl cover 7 and fracture of the reinforcing ribs 43 are started, thereby accelerating the deformation of the cowl cover 7, with the result that Therefore, during a normal traveling, even if snow lies thick on the upper surface of the cowl cover 7 and a small load is thereby inputted in the cowl cover 7, since the rigidity of the cowl cover 7 is large, the deformation of the cowl cover 7 does not occur. Also, while a vehicle stops to get a car washed, even if the occupant puts the hands on the hood 3 to press thereon, for example, since the rigidity of the cowl cover 7 is large, the deformation of the cowl cover 7 does not occur. Meanwhile, when the vehicle collides and the impact load, which is larger than a normal load, is inputted, the flexural deformation of the cowl cover 7 downward started from the notches 45 is ensured.

Incidentally, note that the recessed portion 37 is formed in the front portion of the vertical wall 35, and the cowl cover 7 is elastically deformed by the recessed portion 37. Therefore, even when the front glass 5 is relatively displaced from the cowl box 27, the displacement can be absorbed.

In addition, when the cowl cover 7 is molded by injection molding, it is possible to mold the shape of the vertical wall 35 and the recessed portion 37 with a draft angle to a draft direction of the cowl cover 7. Therefore, only a part of the molding die of the present cowl cover 7 needs to be changed, thereby lowering facilities cost.

Further, the vertical wall 35 is disposed under the rear end portion 3a of the hood 3. Therefore, length of the cowl cover 7 in the vehicle longitudinal direction can be set small. This contributes to an improved outer appearance of the vehicle in terms of design.

Second Embodiment

Next, the vehicle cowl structure of a second embodiment according to the present invention will be explained in detail with reference to FIG. 5.

Figure 5:
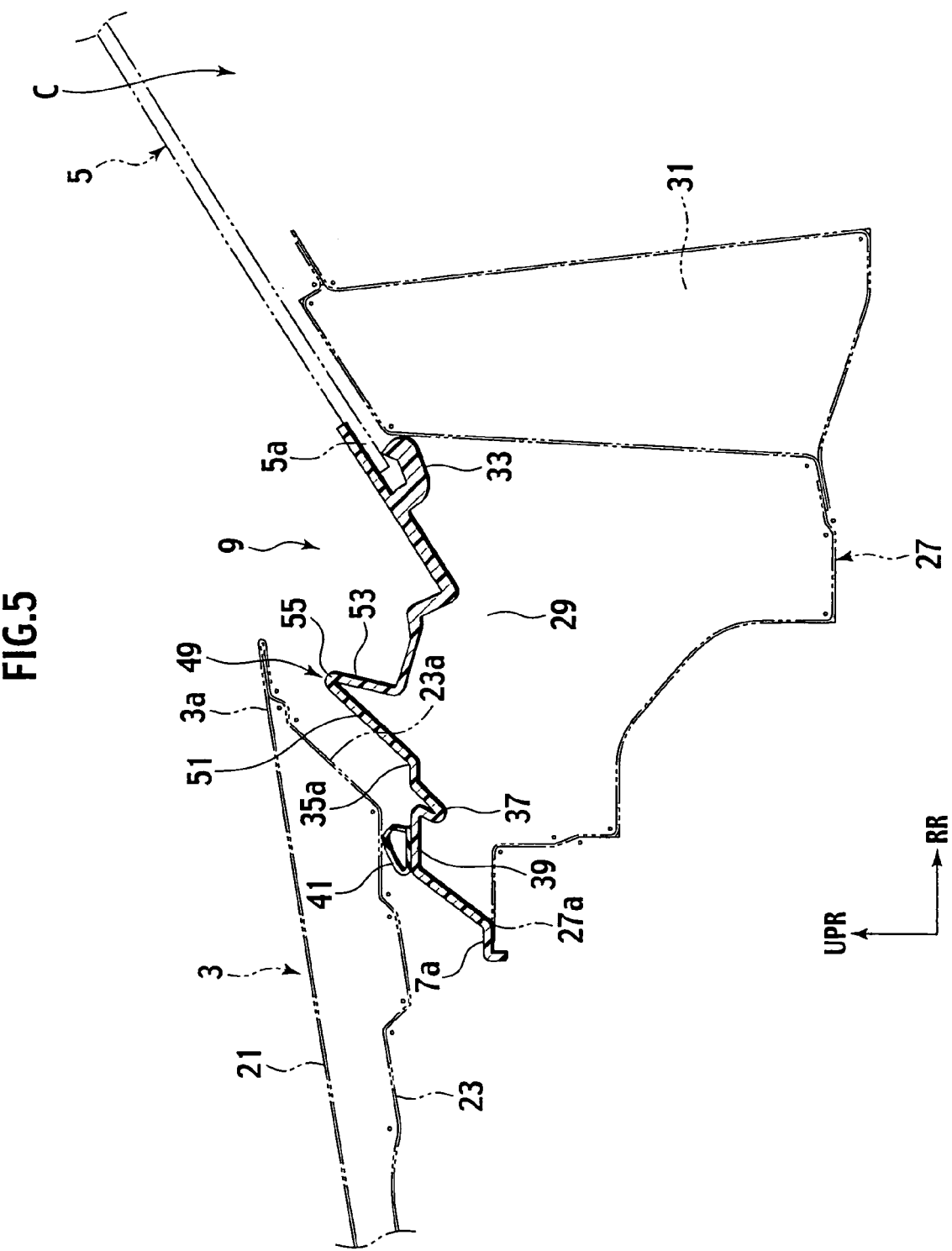
FIG. 5 is a cross sectional view of the vehicle front portion in which the cowl cover of a second embodiment according to the present invention is arranged, corresponding to FIG. 3 in terms of position.

FIG. 5 is a cross sectional view of a vehicle front portion in which the cowl cover of the presently filed embodiment is arranged, corresponding to FIG. 3 in terms of position.

The second embodiment is different from the first embodiment in that a vertical wall 49 is made in the form of an approximately triangle in sectional view by protruding and bending the cowl cover 9 rearward and obliquely upward in the presently filed embodiment, while in the first embodiment, the vertical wall 35 is formed of a single plate-like member. Such a difference between the first embodiment and the second embodiment is focused, and the same members as those in the first embodiment are assigned with the same reference signs and numerals, and the explanation for those members, thus will be omitted simplified.

Specifically, the vertical wall 49 in the presently filed embodiment is formed of a front slope 51 extending rearward and obliquely upward from near the recessed portion 37, and a rear slope 53 extending forward and obliquely downward from a top portion 55 of the front slope 51. The vertical wall 49 thus formed is integrally formed with the cowl cover 9, and can be molded by simply changing the internal shape of the molding die of the cowl cover 9.

In the presently filed embodiment thus constructed, the vertical wall 49 is integrally formed with the front slope 51 and the rear slope 53. Thus, strength can be more enhanced than that of the vertical wall 35 of the first embodiment.

Therefore, even when rather heavy snow lies thick on the upper surface of the cowl cover 9 and the load toward the vehicle front side with respect to the vertical wall 49 is inputted, the deformation of the cowl cover 9 does not easily occur. Meanwhile, when the vehicle collides and the impact load exceeding a prescribed value is inputted, the impact energy can be efficiently absorbed by the flexural deformation of the cowl cover 9.

Third Embodiment

Next, the vehicle cowl structure of a third embodiment according to the present invention will be explained in detail with reference to FIG. 6.

Figure 6:
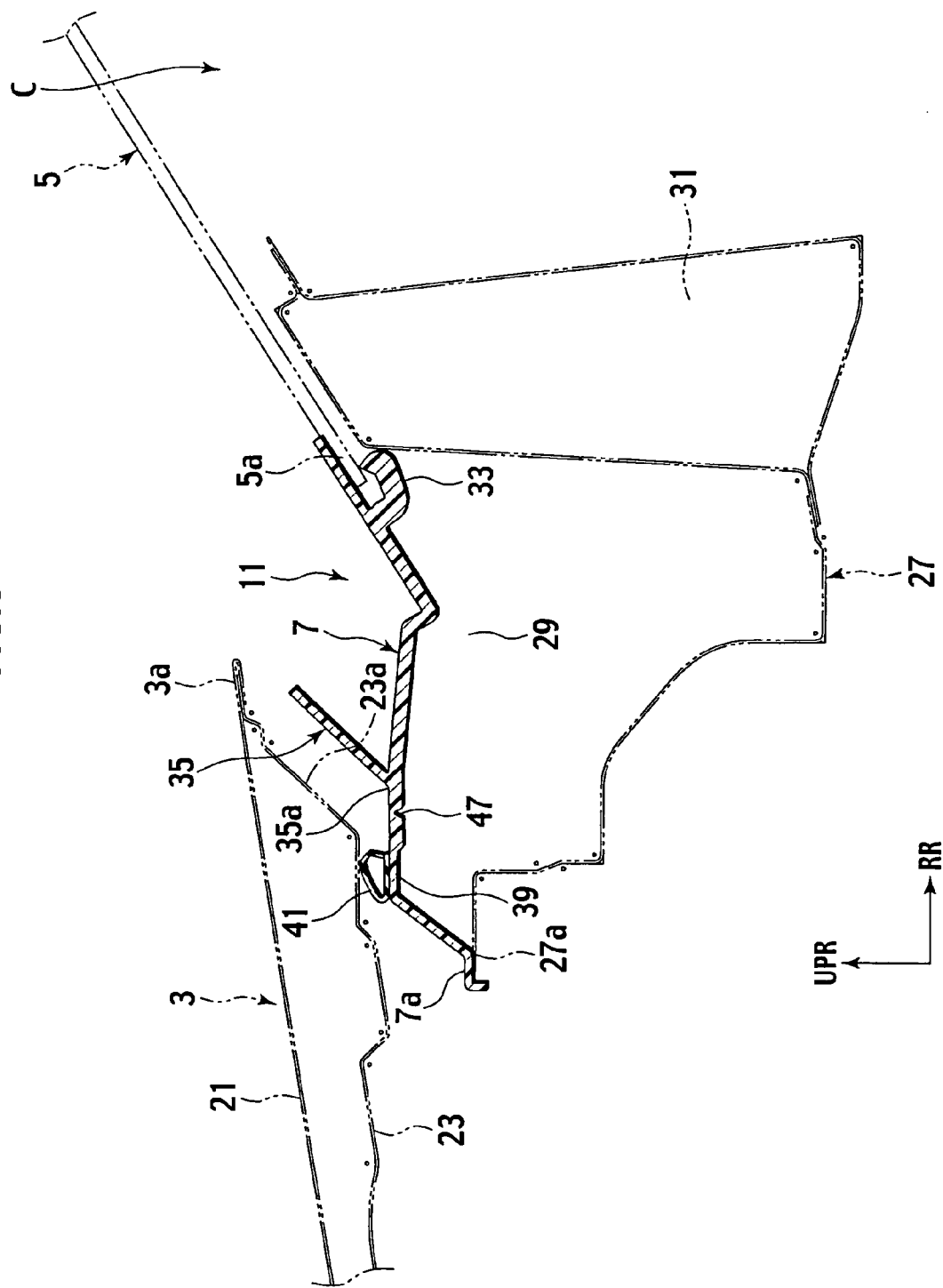
FIG. 6 is a cross sectional view of the vehicle front portion in which the cowl cover of a third embodiment according to the present invention is arranged, corresponding to FIG. 3 in terms of position.

FIG. 6 is a cross sectional view of a vehicle front portion in which the cowl cover of the presently filed embodiment is arranged, corresponding to FIG. 3 in terms of position.

In the presently filed embodiment, the vertical wall 35 is formed of the same plate-like member as that of the first embodiment. However, the third embodiment is different from the first embodiment in that the fragile portion is defined not as the recessed portion 37, but defined as a notch 47 formed on the lower surface of the cowl cover 11. Such a difference is focused, and the same members as those in the first embodiment are assigned with the same reference signs and numerals, and the explanation for those members, thus, will be omitted or simplified.

Namely, the notch 47 in the presently filed embodiment is provided in the form of approximately triangle on the side view, from which the flexural deformation of the cowl cover 11 is started upon exertion of the impact load vertically.

In the presently filed embodiment thus constructed, the fragile portion made up of the notch 47 is provided. Therefore, the length in the vehicle longitudinal direction can be made small, and the length of the cowl cover 11 itself in the vehicle longitudinal direction can be made small. In addition, the structure of the presently filed embodiment can contribute to narrowing the space between the front glass 5 and the hood 3 from the viewpoint of the outer appearance of the vehicle in terms of design.

As described above, according to the vehicle cowl structure of the present invention, the vertical wall is slantingly disposed rearward and obliquely upward. Therefore, at normal time, even if a little load is applied in the rear end portion of the hood, the deformation of the cowl cover does not occur, whereas when the vehicle collides, thereby applying a large impact load, the vertical wall is deformed to allow efficient absorption of the impact energy.

Thus, while the vehicle stops to get a car washed, and even if the occupant puts the hands on the hood 3 to press thereon, the vertical wall and the cowl cover are not deformed. Meanwhile, when the vehicle collides and a large impact load is inputted, the vertical wall is deformed to absorb the impact energy.

Incidentally, note that the rear side of the hood is not seen by the vertical wall, and this contributes to an improved outer appearance. Moreover, needles to say, the infiltration of snow or others into the engine room can be prevented.

The entire content of a Patent Application No. TOKUGAN 2004-036795 with a filing date of Feb. 13, 2004 in Japan is hereby incorporated by reference.

Although the invention has been described above by reference to certain embodiments of the invention, the invention is not limited to the embodiments described above. Modifications and variations of the embodiments described above will occur to those skilled in the art, in light of the teachings. The scope of the invention is defined with reference to the following claims.

What is claimed is:

1. A vehicle cowl structure, comprising:
   a cowl box disposed so as to be positioned between a rear end portion of a hood and a front end portion of a front glass;
   a cowl cover covering an upper portion of the cowl box; and
   a vertical wall provided at a position under the rear end portion of the hood in the cowl cover, the vertical wall slantingly projecting rearward and obliquely upward in the cowl cover with an upper end portion that is an open end to be deformable with an impact load inputted downward from the rear end portion of the hood to the upper end portion, and a fragile portion being provided near a base portion of the vertical wall to bend and deform the cowl cover when a load exceeding a predetermined value is inputted downward from the rear end portion of the hood.

2. The vehicle cowl structure according to claim 1, wherein the vertical wall is a plate member extending rearward and obliquely upward from an upper surface of the cowl cover.

3. The vehicle cowl structure according to claim 1, wherein the vertical wall corresponds to an approximately triangle portion in cross sectional view, composed with a front slope and a rear slope formed by protruding the cowl cover rearward and obliquely upward.

4. The vehicle cowl structure according to claim 1, wherein the vertical wall continues over the width direction of the cowl cover.

5. The vehicle cowl structure according to claim 1, wherein the fragile portion corresponds to a recessed portion formed in such a way that the cowl cover is recessed downward.

6. The vehicle cowl structure according to claim 1, wherein the fragile portion corresponds to a notch formed on a lower surface of the cowl cover.

7. The vehicle cowl structure according to claim 1, wherein thickness in the cowl cover formed over a part from the vertical wall to a rear side of the cowl cover is larger than the thickness formed over a part from the vertical wall to a front side of the cowl cover.

8. The vehicle cowl structure according to claim 1, further comprising:
   a reinforcing rib formed upright on a lower surface of the cowl cover along a vehicle longitudinal direction, over a part from the vertical wall to the front end portion of the front glass; and
   a notch formed on a lower part of the reinforcing rib.

9. The vehicle cowl structure according to claim 8, wherein the reinforcing rib is provided continuously to a hook portion connecting the front end portion of the front glass.

* * * * *